UNITED STATES PATENT OFFICE.

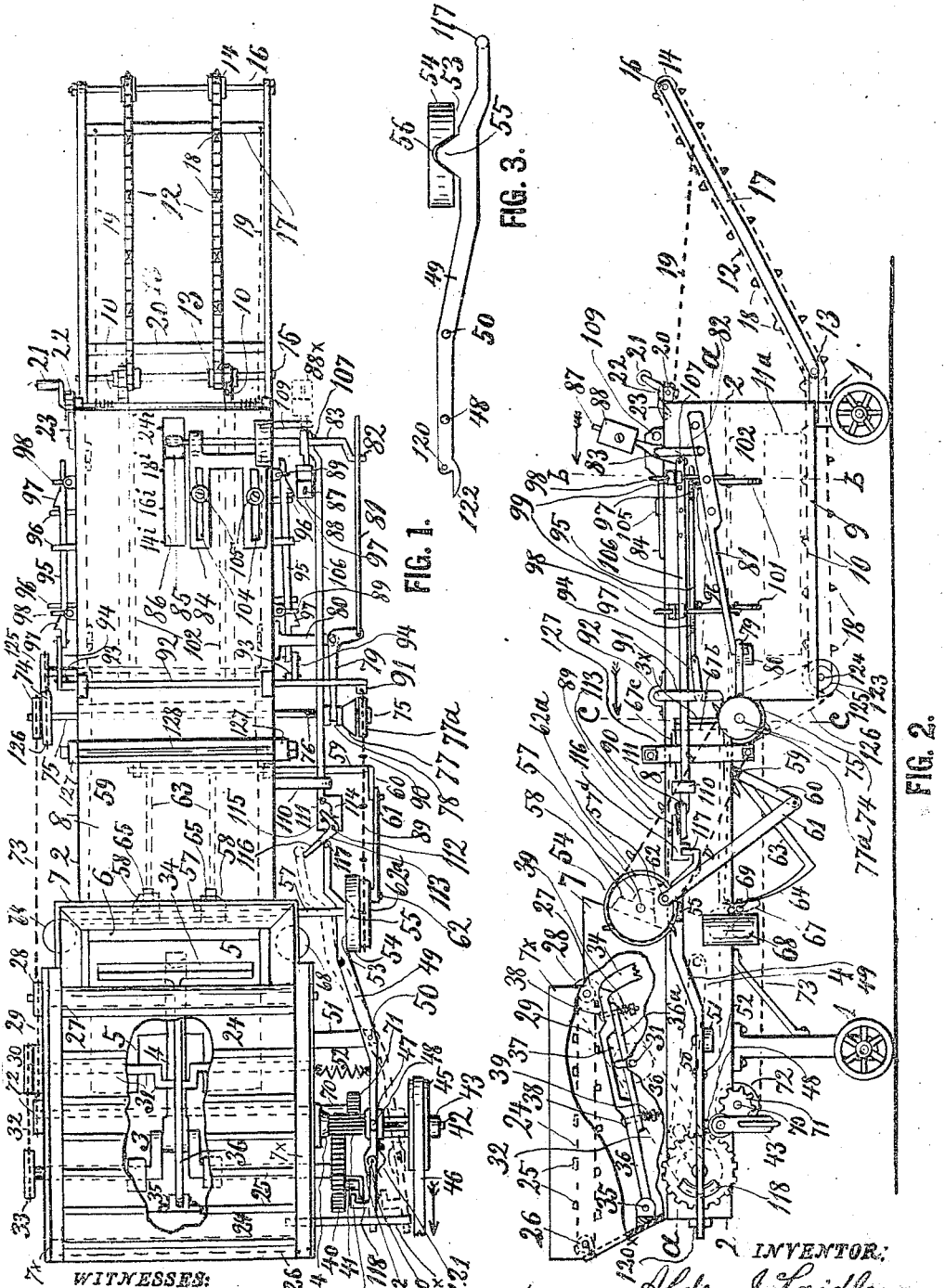

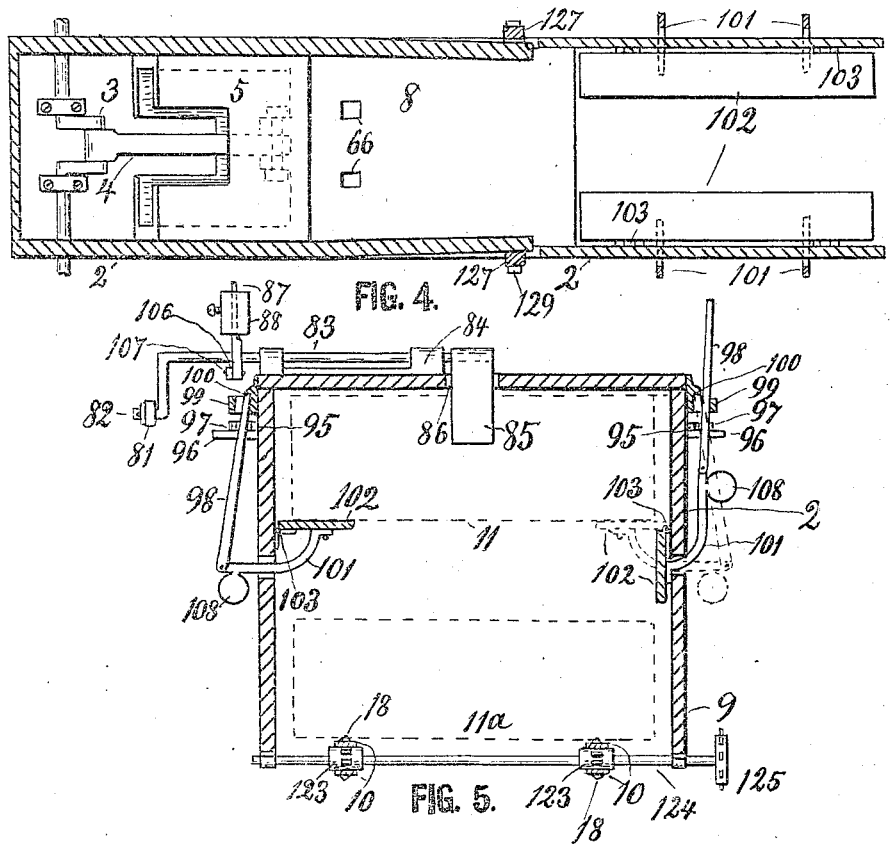
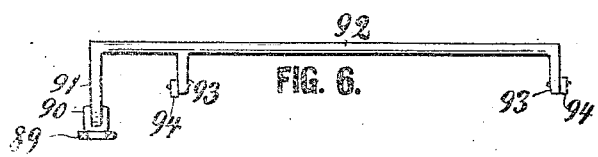
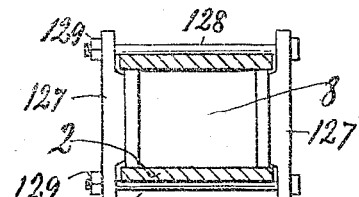

ALDEN J. LAIDLAW, OF RED WING, MINNESOTA.

BALING-PRESS.

No. 880,800.

Specification of Letters Patent.

Patented March 3, 1908.

Application filed March 14, 1907. Serial No. 362,307.

*To all whom it may concern:*

Be it known that I, ALDEN J. LAIDLAW, a citizen of the United States, residing at Red Wing, in the county of Goodhue and State of Minnesota, have invented a new and useful Baling-Press, of which the following is a specification.

My invention relates to baling presses; and the object is to provide a novel, efficient and selfbinding press for baling of hay, straw and similar materials in general, and deliver the bales into wagons if so desired; but more especially the object is to make such press or machine adapted for baling hay, straw, shavings, excelsior and the like materials into small bales to be used for fuel. This and other objects I attain by the novel construction and combinations of parts illustrated in the accompanying drawings, in which—

Figure 1 is a top or plan view of my improved baling press. Fig. 2 is a side elevation of Fig. 1 with the drive pulley 45 and drive belt 46 omitted. Fig. 3 is a bottom view of the cam 54 and lever 49 in Figs. 1 and 2. Fig. 4 is a sectional top view of the main frame on the line $a\ a$ in Fig. 2, with the plunger and main crank and pitman therein but not intersected. Fig. 5 is a cross section on the line $b\ b$ in Fig. 2, with much of the mechanism omitted. Fig. 6 is a detail elevation of the rock shaft 92 in Figs. 1 and 2, and some of the parts operating it and operated by it. Fig. 7 is a cross section of the baling chamber on the line $c\ c$ in Fig. 2.

Referring to the drawing by reference numerals, 1, 1 designate any kind of wheeled or not wheeled supports upon which the frame or body of the machine rests at an elevation allowing all its mechanism to work freely above the ground. Said body consists of a horizontally elongated box 2 having a depending portion 9 at one end, and in the other or front end is journaled the main crank shaft 3, operating by a pitman 4 a plunger 5, which moves below the bottom opening 6 of a hopper 7 mounted upon the main frame and thus forms the bales in the baling chamber 8, in which the bales are bound by twine and then pushed upon a pair of hinged shelves or leaves 102, which automatically drop the bales from the position 11 to the position 11ª (see Fig. 5) in the depending portion 9 of the frame, upon endless chains 10 operated by small sprocket wheels 123, fixed on shaft 124, which is turned by sprocket wheel 125, chain 126 and double sprocket 74, chain 73 and sprocket 72, as will presently be more fully described in connection with the binding and bale-dropping mechanism. Said chains 10 carry the bales onto the endless chains 12, which are operated by double sprockets wheels 13 fixed on shaft 15, and passing over the rollers or sheaves 14 on shaft 16 journaled in an inclined frame 17 forms with said frame an inclined conveyer, by which the bales are deposited in wagons for removal, or the conveyer may be high enough to make a stack of bales. The conveyer chains 10 and 12 are provided with teeth or projections 18, to prevent the bales from slipping. The conveyer may be more or less inclined by means of cables or chains 19, wound on a shaft 20 by a crank 21, the shaft being held in any position by its ratchet wheel 22 and dog 23 engaging the same.

Upon the front end of the main frame is mounted in suitable frame work an endless conveyer belt or apron 24, having cleats 25. This conveyer is stretched over rollers 26—27, of which the latter is turned by its fixed sprocket wheel 28, chain 29, double sprocket wheel 30, fixed on packer shaft 31, and driven by chain 32 and sprocket wheel 33 fixed on the main crank-shaft 3, so that when the straw is deposited by hand or by a straw-stacker of a threshing machine upon the conveyer 24, the latter moves it into the hopper 7, where it is packed down into the path of the plunger 5 by a packer 34, which has its supporting arm 36, pivoted at 35 and is vibrated vertically by the crank-shaft 31, whose crank engages in the slot 37 of the arm; the lower bar 36ª of said arm is yieldingly held by the bolts 38 and springs 39 so that the packer will make smaller and smaller strokes if the hopper gets filled faster than the plunger can remove the material.

On the main crank shaft 3 is fixed a comparatively large gear-wheel 40, turned by a pinion 41, sliding on a feather-keyed shaft 42, journaled in a bracket 43—44, and rotated by a pulley 45 and belt 46; the latter may be driven by any suitable source of power. Near one end of the pinion 41 is an annular groove 47, in which engages one or more pins 48 of a lever 49, fulcrumed at 50 to a bracket 51, and held by a spring 52 with the pinion normally engaging the gear 40; but allowing its disengagement when the face 53 of a cam 54 (see Fig. 3) acts on the projection 55 of the lever during an entire revolution of the cam, whereupon the spring throws the projection of the lever into the notch 56 of the cam, and the pinion 41 into meshing contact with the gear 40. From this it will be understood that the cranks 3 and 31 and plunger 5 stand still while the cam 54 and its shaft 57 make one revolution, and thus tie the twine about the bales as fast as they have attained the predetermined length.

In further explaining the above it will be observed that the shaft 57 operates two knotting devices or knotters 58, mounted near the rear of the hopper, where they are merely indicated in the drawing but not illustrated as to construction, since the latter is the same as the well known knotters used in selfbinding harvesters. Below the baling chamber is journaled a rock-shaft 59, rocked by its short arm 60, pitman 61 and pin 62 in the sprocket wheel 62$^a$, which is secured on the same shaft as cam 54, or may even be made integral with the cam. On the rock-shaft 59 are also fixed two longer arms 63 having each a needle 64 whose points when the shaft is rocked ascend through an aperture 66 in the bottom and 65 in the top of the baling chamber, and carrying in its eye the twine 67, extending from the twine ball holder 68 through the tension device 69 and over the bale as indicated by dotted line 67$^b$, 67$^c$, to the knotting device, brings to the knotter the part of the twine to be tied into a knot with the part always remaining there, and as the knot is tied the needle descends, of course the two needles act in the same manner, and the twines hang down from the knotters in the path of the next bundle formed and are thereby placed over the bottom, top and one end of the bale, the needles bringing them up over the other end.

The means by which the cam 54 is started and stopped will now be described. Below the crank chamber is journaled a transverse shaft 70, driven by its gear 71, which meshes at all times with the pinion 41, at the opposite end of said shaft is fixed a sprocket wheel 72, driving by a chain 73 a double-sprocket wheel 74 fixed on a shaft 75, on whose opposite end is guided by a feather key 76 a slidable friction clutch member 77, having an annular groove 78 engaged by a bell-crank lever 79, pivoted to a bracket 80 and operated by a rod 81 and crank or rocker arm 82 of a rock-shaft 83, journaled in an adjustable frame 84 and having a trigger arm 85 depending downwardly through a slot 86 in the top of the baling chamber (as best shown in Fig. 5), so that when a finished bale is pushed by the next bale against the trigger the shaft will rock and push the clutch-member 77 into frictional contact with its meeting member, which is formed on the inner side of the sprocket wheel 77$^a$, which is loose on its shaft and only turned when the friction between the clutch-members becomes great enough to turn it. To make said friction more prompt-acting, I fix on the shaft 83 an arm 87 with a weight 88 on it, so that when the weighted arm falls from its vertical position above the shaft to the front, as in full lines in Fig. 1 the clutch member 77 will be thrown and held into sufficient frictional contact to turn cam 54. When the clutch member 77 thus operates the wheel 77$^a$, chain 89, wheel 62$^a$ and cam 54, the fingers 90 on chain 89 will touch the rocker arm 91 of a rock-shaft 92 journaled across the top of the baling chamber and having two other rocker-arms 93 (see Fig. 6), each of which is connected by a link 94, to the adjacent end of a horizontal rod 95, sliding loosely between pins 96 or any other suitable guides, and provided with two lateral cams 97, which act as wedging cams to throw outward the supporting props 98, which slide vertically in guides 99, where the upper end of each prop normally engages a cap or projection 100, as to the left in Fig. 5, but when disengaged therefrom by the cam 97 ascends as in full line to the right. The lower ends of these props are pivoted to segmental arms 101, fixed to two folding leaves 102, hinged at 103, and supporting the bale until it has acted on the trigger 85 and thus caused the cams 97 to trip the leaves in the manner and by the means just described. As soon as the leaves are released of the bale, the weights 108 restore them to the level position again.

In order to make long and short bales, the small frame 84 is provided with long slots 104 for the screws 105 holding it, and the rods 81 and 106 are provided with several holes for the crank 82 and the pivot 107, so that the trigger may be moved to 14$^i$, 16$^i$, 18$^i$ or 24$^i$, which marks in Fig. 1 mean bales, 14, 16, 18 and 24 inches long; the bales may however be made of any other length and of any desired thickness, although about 6 by 8 inches thick and 14 to 24 inches long will cover the present requirement for fuel of this class.

The weighted arm 87 is restored to its normal position, leaning against a peg 109 and with the trigger 85 in position to receive a push from the next bale; this restoring is effected by the rod 106, pivoted to the lower end of the weighted arm 87 and sliding in a bearing 110. At the front end of this rod is a plate 111, on which is pivoted at 112 a bell-crank lever 113, whose short arm is held by a spring 114 against a pin or stop 115, and the long arm is provided with a lateral wing 116 standing normally in an oblique position to the rod. The lever 49 has a finger 117, which when moved by said lever from the full-line position to the dotted position in Fig. 1, simply causes the spring 114 to yield, and when the spring 52 throws the lever from the dotted to the solid line position, the finger 117 acts upon the rear side of the wing or incline 116 and pulls the rod 106 forward and the weighted arm occupies the position 88×.

To prevent the needles 64 from ascending while the plunger is in their path, I use the following means; the gear 41 has upon its outer side a segmental hook or guard 118, which when the crank ↄ holds the plunger in the path of the needles is in a position to engage a hook 119, pivoted at 120 to the lever 49, is guided in a fork 120× and is normally held by a spring 121 against a projection 122 of the lever. By this arrangement it is obvious that as long as the plunger is in the way for the needles the hook 118 will hold lever 49 in the notch 56 of the cam 54, and when the latter cam can thus not turn, the clutch member 77 cannot turn wheel 77ª but must slip on it for a moment until the plunger is sufficiently retracted to let the needles pass to the knotters. The spring 121 makes entirely sure that the guard 118 shall never prevent the spring 52 from throwing the lever 59 into the notch of cam 54 as soon as the latter is in a position to receive it. Of course only accidental turning of the gear 40 could cause the guard to resist by its outer side the hook 119, but if it should happen, then the spring 121 will swing the hook 119 inward as soon as the gear 40 starts to turn.

The hopper 7 and the guarding boards 7× at the sides of the conveyer 24 are preferably detachable from the main frame. The dropping chamber in which the shelves 102 are located is wider than the baling chamber so as to give the bales a chance to drop freely. The rear end of the baling chamber proper, which terminates at the vertical side slots 3×, has said terminal ends of its side planks contracted or sprung inward by a clamping device (best shown in Fig. 7), consisting of two clamping blocks 127 and bolts 128 passed through them close by the top and bottom of the chamber, and provided with nuts 129, the turning of which will bring the embossments at the inner sides of the blocks in between the top and bottom plank of the chamber and force the side planks toward each other.

Having thus described my invention, what I claim is:—

1. In a baling-press, the combination with a baling chamber and an automatic binding device, of a pair of downwardly foldable normally level shelves arranged for the bale to slide upon as it is pushed out from the baling chamber, a trigger or trip in the path of the bale and adapted to be operated by the bale when it is fully on to the shelves, and means whereby the trigger trips the shelves and drops the bale, means for restoring the shelves to normal position automatically, and an automatic conveyer below the shelves for removing the bales.

2. A baling-press having a horizontally disposed baling chamber, a hopper above the same, an endless conveyer apron arranged to feed the hopper, a plunger reciprocated below the hopper and the conveyer, a crank shaft below the conveyer, a pitman operated thereby and driving the plunger, and means for turning the crank shaft by power, a packer vibrating vertically in the hopper and having a supporting arm extended forwardly between the conveyer and the said crank shaft and being pivoted to the frame work, and formed with a slot, a smaller crank shaft journaled to the frame work, and having its crank inserted in said slot so as to vibrate the packer.

3. A baling-press having a baling chamber and a plunger working therein, a packer feeding materials down into the chamber and having a slotted supporting arm pivoted to the frame work, and a crank engaging in the slot to operate the packer, one of the bars forming the slot having a yielding spring connection with the arm for the purpose set forth.

4. In a baling-press, the combination of a baling chamber, a power-operated shaft, a pinion slidingly keyed thereon, a main crank-shaft with a pitman and plunger operated thereby in the baling chamber, a gear fixed on the main shaft and driven periodically by the pinion, a packer and packer crank-shaft operatively connected with the main crank shaft, a secondary shaft, 70, having a fixed gear permanently meshing with the sliding pinion, a bale-binding device arranged to bind each bale while it is in the chamber, operative connection between the secondary shaft and the binder, a clutch inserted in said operative connection, a trigger in the path of the bale pushed by the bale about to be bound, and means whereby said trigger causes the clutch to start the binder, a cam on the binder-shaft, a spring-held lever pivoted to the frame-work and operated by the cam against the action of the spring, means for dropping the bale that acted on the trigger, means whereby said lever restores the trigger to normal position after the bale is dropped, and also throws the clutch out of action as soon as the binder has bound the bale in the chamber, said lever operating the sliding pinion, thereby stopping the main crank shaft, the plunger and the packer while the binding device is at work, all operated automatically from the one drive shaft.

5. In a baling-press, the combination of a baling chamber, a power-operated shaft, a pinion slidingly keyed thereon, a main crank-shaft with a pitman and plunger operated thereby in the baling chamber, a gear fixed on the main shaft and driven periodically by the pinion, a packer and packer crank-shaft operatively connected with the main crank shaft a secondary shaft, 70, having fixed gear permanently meshing with the sliding pinion, a bale-binding device arranged to bind each bale while it is in the chamber, operative connection between the secondary shaft and the binder, a clutch inserted in said operative connection, a trigger in the path of the bale pushed by the bale about to be bound, and means whereby said trigger causes the clutch to start the binder, a cam on the binder-shaft, a spring-held lever pivoted to the framework and operated by the cam against the action of the spring, means for dropping the bale that acted on the trigger, means whereby said lever restores the trigger to normal position after the bale is dropped, and also throws the clutch out of action as soon as the binder has bound the bale in the chamber, said lever operating the sliding pinion, thereby stopping the main crank-shaft, the plunger and the packer while the binding device is at work, all operated automatically from the one drive shaft, and automatic means for preventing the plunger from getting in the way for the binding mechanism when the latter is in operation.

In testimony whereof I affix my signature in presence of two witnesses.

ALDEN J. LAIDLAW.

Witnesses:
  WAVERLY B. SARGENT.
  NELLIE TYLER